Patented Dec. 23, 1952

2,623,038

UNITED STATES PATENT OFFICE 2,623,038

CASEIN-LACTALBUMIN COPRECIPITATE AND METHOD OF ITS PREPARATION

Everette C. Scott, Ashton, Ill., assignor to Crest Foods Co., Ashton, Ill., a partnership No Drawing. Application July 24, 1947, Serial No. 763,441

9 Claims. (Cl. 260—120)

Heretofore when casein-lactalbumin was desired, the casein had to be produced separately by a number of steps, the lactalbumin produced separately by a number of steps, and the two mixed together. This made the product relatively expensive, and the quality was rather poor.

According to the present invention, a very superior product is produced at low cost. This is produced by simultaneous precipitation of the casein and the lactalbumin from skim milk. The new product, which is called casein-lactalbumin fusion, has several advantages, aside from cost, over the previous mechanical mixture of casein and lactalbumin. These apparently result from a more homogeneous mixture of much finer particles. Each particle of lactalbumin is engulfed within the casein. The casein thus holds the lactalbumin and facilitates treatments such as washing or further refining. The refined product is suitable for many uses including use as a protein supplement in human feeding, especially hospital feeding of convalescent and pre-operative and post-operative cases, pregnancy cases, and patients having ulcers or burns. It is also very beneficial for elderly persons who do not normally ingest sufficient protein or protein of proper quality.

The casein-lactalbumin fusion is whiter than the mechanical mixture of the same proportion. It lacks the hardness and brittleness of lactalbumin alone and the toughness of casein alone. It grinds in a hammermill more readily than either alone. It may be treated more quickly and completely in various ways than the prior physical mixture of casein and lactalbumin. For example, it responds very quickly to treatment by enzymes or the combined action of salts and enzymes or other treatments to render it soluble or more easily digested.

The cost of the product is considerably decreased by virtue of the new method of production included in this invention. A single operation with one precipitation takes the place of two independent operations, each with its separate precipitation. This alone results in savings in time, equipment, space, acid and alkali. In addition to having only one precipitation instead of two, some of the difficulties previously encountered in washing, purifying and mixing are avoided.

The preferred method of production is as follows: Skim milk of an acid content normal to manufacturing skim milk is delivered into a suitable receptacle, such as a conventional cheese vat. A solution of mild alkali, such as sodium carbonate or sodium bicarbonate, or a mixture of the two salts, is added to reduce the acidity of the milk to 0.04 to 0.14%—preferably 0.10 to 0.11%. Any other harmless alkaline material may be used, including lime or sodium hydroxide. If a skim milk should be available with an acidity as low as thus indicated, the use of the alkaline material may be eliminated. The acidity figures used throughout this application refer to titratable acidity, measured as lactic acid.

The skim milk is heated, indirectly or by direct steam injection, to a temperature of 180° F. to 212° F.—preferably 190° F. to 194° F. During this heating period, a slight or partial precipitation of the lactalbumin may occur, and particularly so if the acidity of the skim milk is as high as 0.12%. This slight precipitation, which occurs mostly in a very fine state, is not very objectionable in the manufacture of my casein-lactalbumin fusion, since any finely dispersed lactalbumin which does not settle will be subsequently gathered within the greater mass of casein.

When the desired temperature is reached, sufficient acid is added to bring about the concomitant precipitation (not necessarily simultaneous) of the casein and lactalbumin. As the acid is added, the casein first "sets" in the form of a firm jell. It is broken up by vigorous agitation. This casein-lactalbumin mass firms quickly at this high temperature, and the whey rapidly exudes from the protein mass, much the same as in the making of cheese or casein. The casein mass, which is approximately five times greater than the lactalbumin, acts much like a filter-aid, engulfing the finely precipitated lactalbumin in a homogeneous mass. As stirring proceeds, the whey becomes greenish in color and very clear, with a complete absence of turbidity.

This precipitation may be effected by the addition of any desired acid, such as sulphuric, hydrochloric, lactic, acetic, hydroxy-acetic, phosphoric, citric or tartaric. Sufficient acid is added to effect complete precipitation, with a resultant clear whey. At this point, the acidity of the clear whey will normally test 0.25% to 0.26% acid. Other acidities in the range of 0.20% to 0.30% may be encountered.

The manner of adding the acid is of the utmost importance in the making of casein-lactalbumin fusion. A slow precipitation technique is employed, but with no opportunity for separation of the precipitate until the precipitation is complete. The acid used is preferably quite dilute. Thus, one part of commercial hydrochloric acid (18° Baumé) may be added to four parts of water to provide an acid of about 7 or 8%. This dilute acid is added to the skim milk in 4 to 5 parts or additions, with continuous agitation. This effects, first, a soft, custard-like precipitation, which is essentially the casein fraction. As further additions of the acid are added, the lactalbumin is precipitated. It is also probable that a considerable amount of the trace proteins, such as globulin, fibrin, nuclein, etc., are also precipitated and become a part of the fusion. This assumption is borne out by the fact that the biologic value of the casein-lactalbumin fusion is higher than might be expected from a product comprising essentially 4½ parts of casein to 1 part of lactalbumin. This biologic value, which is normally 25% higher than that of casein, is attributed to the slow precipitating technique employed. The slow precipitation could also be accomplished by slow addition of the acid continuously during constant agitation, the rate being slow enough to permit the initial custard-like precipitation throughout the mass.

A further pertinent part of our process is the refining of the casein-lactalbumin fusion to increase the relative protein content, increase the pH, and decrease the milk sugar and ash contents. To accomplish this, the whey is drawn from the vat, and the fusion of casein-lactalbumin is thoroughly washed with hot water. It may be washed repeatedly, depending upon the final protein contents desired. An optional method of washing is to wash first with cold water. This softens the casein increment and firms the lactalbumin. This cold water wash is then followed by at least two hot water washes, with the wash water at a temperature of 150 to 190° F. The wash water is removed and the mass of curd is allowed to drain. The curd forms a solid mass, with a solids content (after draining) normally ranging between 25% and 50%.

The curd may be used in this form or may be prepared for drying. If it is to be dried on screens or trays, the curd is first pressed, by any of the many conventional methods, then ground finely, spread on the screens or trays, and dried in a wind tunnel. If it is to be dried by rollers or spray dryers which are well-known to the dairy industry, the product is first mixed with cold water and is finely comminuted. The particles of curd are broken sufficiently to form essentially a colloidal suspension. The solids content of this colloidal suspension ranges from 5% to 15%, 8% to 10% being preferred. This suspension is then dried, either on the roll or by means of a spray dryer.

This refined fusion may be admixed with other materials, such as food yeast, vitamins, etc., or with identifying flavoring materials. It may also be partially or completely predigested by hydrolysis using trypsin or erypsin, or other proteolyzing enzymes, such as papain, or mixtures thereof; or acids and alkalis. Resultant flavors are most desirable in the case of the use of trypsin and erypsin.

I claim:

1. A method of producing an interspersed precipitation of casein-lactalbumin comprising the steps of adding alkali to skim milk to reduce its acidity at least as low as .12% to inhibit precipitation during heating, heating the milk to a temperature of approximately 194° F., adding sufficient acid to the milk to precipitate both casein and lactalbumin in intimate interspersion, vigorously agitating the resulting product, removing it from the remaining whey and washing the product with hot water.

2. The method of producing an interspersed precipitation of casein-lactalbumin comprising the steps of adding alkali to skim milk to reduce its acidity at least as low as .12% to inhibit precipitation during heating, heating the milk to a temperature of approximately 194° F., adding sufficient acid to the milk to precipitate substantially all of both casein and lactalbumin in intimate interspersion, with a resultant clear whey.

3. The method of producing an interspersed precipitation of casein-lactalbumin comprising the steps of adding alkali to skim milk to reduce its acidity at least as low as .12% to inhibit precipitation during heating, heating the milk to a temperature high enough for acid precipitation of casein and lactalbumin concomitantly, while maintaining the acidity low enough to inhibit precipitation during the heating and adding sufficient acid to the milk to precipitate both casein and lactalbumin in intimate interspersion.

4. Casein-lactalbumin coprecipitation produced in accordance with the method of claim 3.

5. The method of producing an interspersed precipitation of casein-lactalbumin comprising heating skimmed milk to a temperature high enough for acid precipitation of casein and lactalbumin while maintaining the milk at an acidity at least as low as .12% to inhibit precipitation during heating, thereafter adding sufficient acid to the milk to precipitate the entire casein and lactalbumin content of the hot milk in intimate interspersion.

6. The method of producing an interspersed precipitation of casein-lactalbumin comprising the steps of adding alkali to skim milk to reduce its acidity at least as low as .14% and not less than .04% to inhibit precipitation during heating, heating the milk to a temperature high enough for acid precipitation of casein and lactalbumin concomitantly while maintaining the acidity low enough to inhibit precipitation during the heating and adding sufficient acid to the milk to precipitate both casein and lactalbumin in intimate interspersion.

7. The method of producing an interspersed precipitation of casein-lactalbumin comprising the steps of adding alkali to skim milk to reduce its acidity at least as low as .11% and not less than .04% to inihibit precipitation during heating, heating the milk to a temperature high enough for acid precipitation of casein and lactalbumin concomitantly, while maintaining the acidity low enough to inhibit precipitation during the heating and adding sufficient acid to the milk to precipitate both casein and lactalbumin in intimate interspersion.

8. Casein lactalbumin coprecipitation produced in accordance with claim 6.

9. Casein lactalbumin coprecipitation produced in accordance with claim 7.

EVERETTE C. SCOTT.

REFERENCES CITED

The following references are of record in the file of this patent:

UNITED STATES PATENTS

| Number | Name | Date |
| --- | --- | --- |
| 482,897 | Frederiksen | Sept. 20, 1892 |
| 664,318 | Hall | Dec. 18, 1900 |
| 1,557,181 | Messmer | Oct. 13, 1925 |
| 1,870,270 | Washburn | Aug. 9, 1932 |